US012775074B2

(12) United States Patent
Burghart et al.

(10) Patent No.: US 12,775,074 B2
(45) Date of Patent: Oct. 27, 2026

(54) LIGHT SOURCE DRIVING DEVICE, LIGHT SOURCE DEVICE, AND DISTANCE MEASURING DEVICE

(71) Applicant: SONY SEMICONDUCTOR SOLUTIONS CORPORATION, Kanagawa (JP)

(72) Inventors: Michael Kline Burghart, Kumamoto (JP); Hayato Kamizuru, Kumamoto (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 986 days.

(21) Appl. No.: 18/001,403

(22) PCT Filed: Apr. 27, 2021

(86) PCT No.: PCT/JP2021/016704
§ 371 (c)(1),
(2) Date: May 30, 2023

(87) PCT Pub. No.: WO2021/256094
PCT Pub. Date: Dec. 23, 2021

(65) Prior Publication Data

US 2025/0138164 A1 May 1, 2025

(30) Foreign Application Priority Data

Jun. 15, 2020 (JP) ................................ 2020-103106

(51) Int. Cl.
*G01S 7/484* (2006.01)

(52) U.S. Cl.
CPC ................................... *G01S 7/484* (2013.01)

(58) Field of Classification Search
CPC ...... G01S 7/484; G01S 7/4865; G01S 7/4911; G01S 7/497; G01S 17/931; G01C 3/06; H05B 45/32
See application file for complete search history.

(56) References Cited

U.S. PATENT DOCUMENTS

2019/0064356 A1* 2/2019 Yoon ........................ G01S 17/10
2020/0271783 A1* 8/2020 Koyama ............... G01S 7/4814
(Continued)

FOREIGN PATENT DOCUMENTS

EP 3540468 * 9/2019
JP 2019-041201 A 3/2019
(Continued)

OTHER PUBLICATIONS

International Search Report and Written Opinion of PCT Application No. PCT/JP2021/016704, issued on Jun. 22, 2021, 08 pages of ISRWO.

*Primary Examiner* — Md Saiful A Siddiqui
(74) *Attorney, Agent, or Firm* — CHIP LAW GROUP

(57) ABSTRACT

Provided is a light source driving device includes a light emission drive unit, a drive signal generation unit, a phase difference detection unit, and a delay detection unit. The light emission drive unit supplies a light emission current for causing a light source to emit light. The drive signal generation unit generates a drive signal for driving the light emission drive unit on the basis of a light emission control signal for causing the light source to emit light. The phase difference detection unit detects the phase difference between a light emission period of the light source and the light emission control signal. The delay detection unit detects a delay in the light emission on the basis of the detected phase difference.

10 Claims, 13 Drawing Sheets

(56) References Cited

U.S. PATENT DOCUMENTS

| | | | | |
|---|---|---|---|---|
| 2020/0355828 | A1* | 11/2020 | Schenk | G01S 17/10 |
| 2020/0363506 | A1* | 11/2020 | Shen | G01S 7/497 |
| 2022/0018945 | A1* | 1/2022 | Kim | G01S 7/4915 |
| 2022/0187470 | A1* | 6/2022 | Fujisawa | G01S 7/4876 |

FOREIGN PATENT DOCUMENTS

| | | | |
|---|---|---|---|
| WO | 2015/025497 | A1 | 2/2015 |
| WO | 2017/022152 | A1 | 2/2017 |

* cited by examiner

LIGHT SOURCE DRIVING DEVICE, LIGHT SOURCE DEVICE, AND DISTANCE MEASURING DEVICE

TECHNICAL FIELD

The present disclosure relates to a light source driving device, a light source device, and a distance measuring device. Particularly, the present invention relates to a light source driving device that drives a light source, and a light source device and a distance measuring device that uses the light source driving device.

BACKGROUND ART

Distance measuring devices for measuring the distance to an object have conventionally been used for imaging devices such as in-vehicle cameras. For such a distance measuring device, for example, a device may be used that emits laser light to an object and detects light reflected from the object, so that the time required for the laser light to travel to the object and back to the device can be measured to obtain the distance. A driving device for a light emitting element used in such a distance measuring device has a problem of variations in delay time of light emission from the light emitting element. This is because such variations cause an error in distance measurement.

A driving device proposed as such a driving device is, for example, one that sets a target current for attaining a desired emission intensity in distance measurement, in a manner such that the target current is set according to the characteristics of a light emitting element and background light provided when the light emitting element emits no light (see, for example, Patent Document 1). In the prior art, a bias current corresponding to a threshold for light emission from the light emitting element is set in addition to the target current. The drive current for the light emitting element is controlled on the basis of the target current and the bias current that have been set. An error in distance measurement that is caused by an error in, for example, the target current is reduced.

CITATION LIST

Patent Document

Patent Document 1: Japanese Patent Application Laid-Open No. 2019-041201

SUMMARY OF THE INVENTION

Problems to be Solved by the Invention

The above-described prior art has the problem of inability to reduce an error in distance measurement in a case where the delay time of a drive signal for the light emitting element varies. In distance measurement, a processing device for performing the distance measurement outputs a signal for controlling light emission to a driving device for a light emitting element. An error in the distance measurement will occur if a delay time between the timing at which the signal is output and the timing at which the light emitting element emits light varies. The above-described prior art has the problem of inability to reduce the error that is based on a variation in the delay time.

The present disclosure was provided in view of the above-described problems, and an object thereof is to reduce an error that is based on a delay time when a light emitting element is driven.

Solutions to Problems

The present disclosure was provided to solve the above-described problems, and a first aspect thereof is a light source driving device including: a light emission drive unit that supplies a light emission current for causing a light source to emit light; a drive signal generation unit that generates a drive signal for driving the light emission drive unit on the basis of the light emission control signal for causing the light source to emit light; a phase difference detection unit that detects a phase difference between a light emission period of the light source and the light emission control signal; and a delay detection unit that detects a delay in the light emission on the basis of the detected phase difference.

Furthermore, in the first aspect, the phase difference detection unit may detect the phase difference from the light emission control signal, with the drive signal being defined as the light emission period of the light source.

Furthermore, in the first aspect, the phase difference detection unit may detect the phase difference from the light emission control signal, with a signal based on the light emission current being defined as the light emission period of the light source.

Furthermore, the first aspect may further include a light receiving unit that detects the light emission from the light source, and the phase difference detection unit may detect the phase difference from the light emission control signal, with a period of the detected light emission being defined as the light emission period of the light source.

Furthermore, in the first aspect, the phase difference detection unit may output a differential signal corresponding to the detected phase difference, and the delay in the light emission may be detected on the basis of the differential signal output from the phase difference detection unit.

Furthermore, the first aspect may further include a filter that attenuates high frequency components of the detected phase difference, and the delay detection unit may detect the delay on the basis of the phase difference in which the high frequency components have been attenuated.

Furthermore, the first aspect may further include a reception unit that receives the light emission control signal, which is transferred through a signal line path, and outputs the received light emission control signal, the drive signal generation unit may generate the drive signal on the basis of the light emission control signal output from the reception unit, and the phase difference detection unit may detect a phase difference between the light emission period of the light source and the light emission control signal output from the reception unit.

Furthermore, in the first aspect, the signal line path may transfer a differential light-emission-control signal provided by converting the light emission control signal into a differential signal, and the reception unit may receive and convert the transferred differential light-emission-control signal into the light emission control signal.

Furthermore, the first aspect may further include a second reception unit to which the generated drive signal is input, and the phase difference detection unit may detect a phase difference between the light emission period of the light source and the drive signal output from the second reception unit.

Meanwhile, a second aspect of the present disclosure is a light source device including: a light source; a light emission drive unit that supplies a light emission current for causing the light source to emit light; a drive signal generation unit that generates a drive signal for driving the light emission drive unit on the basis of a light emission control signal for causing the light source to emit light; a phase difference detection unit that detects a phase difference between a light emission period of the light source and the light emission control signal; and a delay detection unit that detects a delay in the light emission on the basis of the detected phase difference.

Meanwhile, a third aspect of the present disclosure is a distance measuring device including: a light source; a light emission drive unit that supplies a light emission current for causing the light source to emit light; a drive signal generation unit that generates a drive signal for driving the light emission drive unit on the basis of a light emission control signal for causing the light source to emit light; a phase difference detection unit that detects a phase difference between a light emission period of the light source and the light emission control signal; a delay detection unit that detects a delay in the light emission on the basis of the detected phase difference; a sensor that detects reflected light that is the light emitted from the light source and then reflected from an object; and a processing circuit that performs a process of detecting a distance to the object by measuring a time from the emission of the light to the detection of the reflected light.

Aspects of the present disclosure provide the effect of detecting a delay in light emission on the basis of the phase difference between a light emission period of the light source and a light emission control signal. It is assumed that distance detection is corrected on the basis of the detected delay.

MODE FOR CARRYING OUT THE INVENTION

Figure 1:
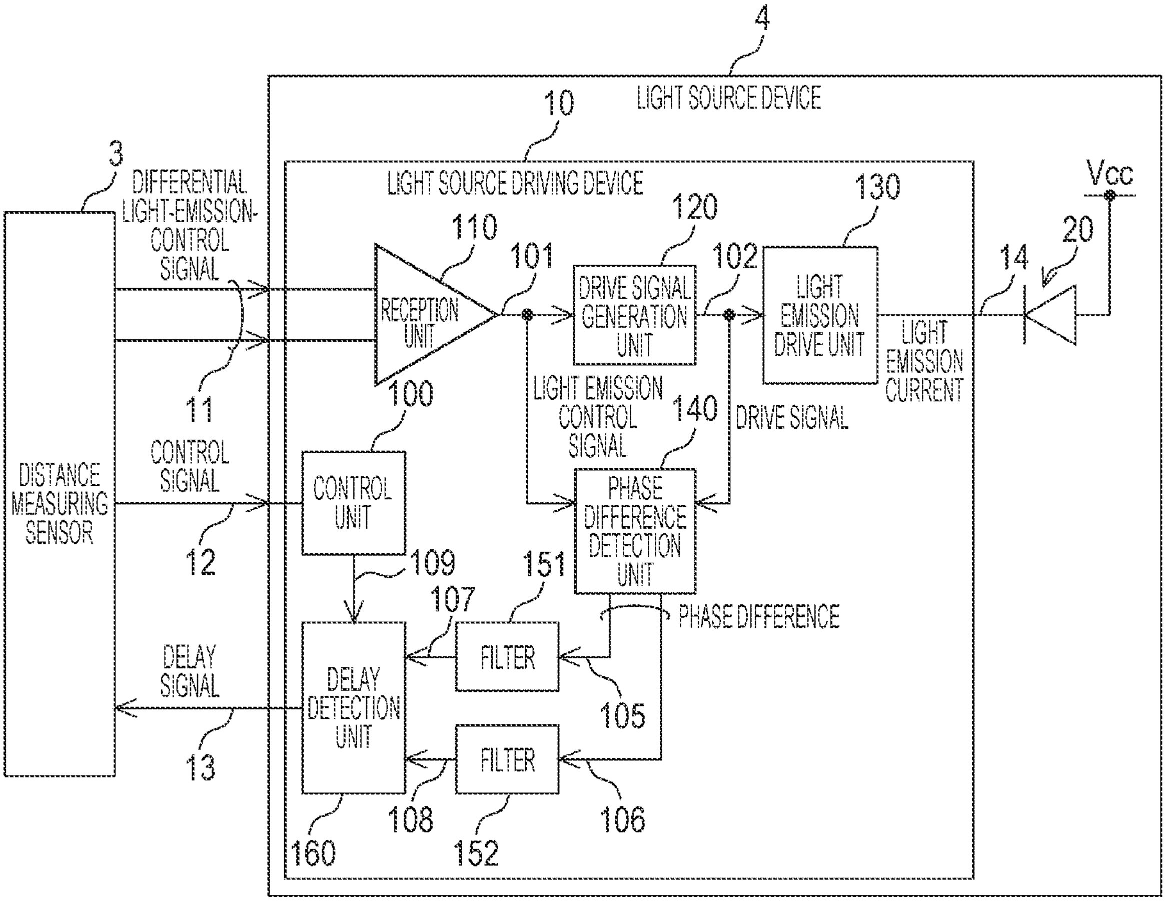
FIG. 1 illustrates a configuration example of a light source device according to a first embodiment of the present disclosure.

Next, modes for carrying out the present disclosure (hereinafter referred to as embodiments) will be described with reference to the drawings. In the drawings referred to in the following, the same or similar parts are denoted by the same or similar reference numerals. Meanwhile, embodiments will be described in the following order.

1. First Embodiment
2. Second Embodiment
3. Third Embodiment
4. Fourth Embodiment
5. Distance Measuring Sensor
6. Distance Measuring Device

1. First Embodiment

[Configuration of Light Source Device]

FIG. 1 illustrates a configuration example of a light source device according to a first embodiment of the present disclosure. FIG. 1 depicts a configuration example of a light source device 4. The light source device 4 emits light to an object to be subjected to distance measurement. Note that, in addition to the light source device 4, a distance measuring sensor 3 forming a distance measuring device is also illustrated in FIG. 1.

The distance measuring sensor 3 measures the distance to the object. The distance measuring sensor 3 detects reflected light that is light emitted from the light source device 4 and reflected by the object, and measures the distance to the object on the basis of a required time from the emission of the light from the light source device 4 to the incidence of the reflected light. Signal lines 11, 12, and 13 are connected between the distance measuring sensor 3 and the light source device 4. A light emission control signal output from the distance measuring sensor 3 is transferred through the signal line 11. In this example, the light emission control signal is intended to cause a light source of the light source device 4 to emit light, and indicates the period (timing) of light emission from the light source. As described hereinafter, a differential light-emission-control signal converted into a differential signal is transferred through the signal line 11 in FIG. 1. A control signal for controlling the light source device 4 is transferred through the signal line 12. A delay signal is transferred through the signal line 13. In this example, the delay signal is output from the light source device 4 and indicates a delay time of light emission from the light source of the light source device 4.

The light source device 4 includes a light source 20 and a light source driving device 10.

The light source 20 emits light. For example, a laser diode that generates laser light can be used for the light source 20.

The light source driving device 10 causes the light source 20 to emit light. The light source driving device 10 causes the light source 20 to emit light on the basis of, for example, a control signal from the distance measuring sensor 3. For example, the light emission may be performed in a manner such that light emission and non-light emission are repeated on a predetermined cycle. Meanwhile, the light source driving device 10 detects a delay time when the light source 20 emits light, and outputs the detected delay time to the distance measuring sensor 3. The light source driving device 10 in FIG. 1 includes a control unit 100, a reception unit 110, a drive signal generation unit 120, a light emission drive unit 130, a phase difference detection unit 140, filters 151 and 152, and a delay detection unit 160.

The control unit 100 controls the entirety of the light source driving device 10. The control unit 100 controls the light source driving device 10 on the basis of a control signal from the distance measuring sensor 3. The control signal from the distance measuring sensor 3 is input to the control unit 100 via the signal line 12. Furthermore, the control unit 100 in FIG. 1 also controls detection of a delay time by the delay detection unit 160 (described hereinafter) and output of the delay time to the distance measuring sensor 3. The control unit 100 outputs the control signal to the delay detection unit 160 via a signal line 109.

The reception unit 110 receives a light emission control signal output from the distance measuring sensor 3. In this example, the light emission control signal may include a digital signal (train of a pulse signal) indicating a light emission period. For example, a period in which the value of the light emission control signal is "1" may be mapped to a light emission period of the light source. The reception unit 110 outputs the received light emission control signal to the drive signal generation unit 120 and the phase difference detection unit 140. The output signal from the reception unit 110 is output via a signal line 101.

Note that the distance measuring sensor 3 in FIG. 1 illustrates an example in which a differential light-emission-control signal, which is a light emission control signal converted into a differential signal, is output. For example, the differential light-emission-control signal may be transferred by low voltage differential signaling (LVDS). In this case, the signal line 11 includes a differential signal line path. The reception unit 110 receives the differential light-emission-control signal transferred by LVDS, converts the differential light-emission-control signal into a single-ended light emission control signal, and outputs the single-ended light emission control signal. A fast signal transfer can be performed by applying the light emission control signal in a differential signal form to the signal transfer between the distance measuring sensor 3 and the light source device 4.

The drive signal generation unit 120 generates a drive signal for driving the light emission drive unit 130 (described hereinafter) on the basis of a light emission control signal output from the reception unit 110. The drive signal generation unit 120 outputs the generated drive signal to the light emission drive unit 130 and the phase difference detection unit 140. The output signal from the drive signal generation unit 120 is transferred through a signal line 102.

The light emission drive unit 130 causes the light source 20 to emit light. The light emission drive unit 130 supplies the light source 20 with a light emission current for causing the light source 20 to emit light. The light emission drive unit 130 can include a semiconductor element such as a MOS transistor. Details of the configuration of the light emission drive unit 130 will be described hereinafter.

The phase difference detection unit 140 detects the phase difference between a light emission period of the light source 20 and a light emission control signal. By detecting the phase difference, a delay in light emission from the light source 20 can be detected with reference to the light emission control signal. The delay in light emission may be subtracted from the required time from the emission of light from the light source device 4 to the incidence of the reflected light, i.e., a time measured by the distance measuring sensor 3, so as to reduce an error when detecting the distance to the object.

The phase difference detection unit 140 in FIG. 1 detects the phase difference between a light emission control signal output from the reception unit 110 and a light emission control signal output from the drive signal generation unit 120. In particular, the phase difference detection unit 140 in FIG. 1 detects the phase difference, with the light emission control signal output from the drive signal generation unit 120 being defined as a light emission period of the light source 20. Furthermore, the phase difference detection unit 140 in FIG. 1 outputs the detected phase difference in the form of a differential signal. Specifically, phase difference signals having phases opposite to each other are generated and output separately via two signal lines 105 and 106. Details of the configuration of the phase difference detection unit 140 will be described hereinafter.

The filters 151 and 152 attenuate the high frequency components of the phase difference detected by the phase difference detection unit 140. The filters 151 and 152 may include low-pass filters. The phase difference signals output from the phase difference detection unit 140 include pulse signal trains having a pulse width corresponding to the phase difference. The filters 151 and 152 attenuate the high frequency components of the pulse signals so as to generate low-frequency phase difference signals having a voltage corresponding to the phase difference. The filter 151, which is connected to the signal lines 105 and 107, attenuates the high frequency components of the phase difference signal input via the signal line 105, and outputs the resultant signal to the signal line 107. The filter 152, which is connected to the signal lines 106 and 108, attenuates the high frequency components of the phase difference signal input via the signal line 106, and outputs the resultant signal to the signal line 108.

The delay detection unit 160 detects a delay in the light emission at the light source 20 on the basis of the phase difference detected by the phase difference detection unit 140. The signal lines 107 and 108 are connected to the delay detection unit 160 in FIG. 1. The phase difference signals of the differential signal, for which the filters 151 and 152 have attenuated high frequency components, are input to the delay detection unit 160. Then, the delay detection unit 160 generates a delay signal corresponding to the delay time from the phase difference signals of the differential signal and outputs the delay signal to the distance measuring sensor 3 via the signal line 13. In this situation, the delay detection unit 160 can output a delay signal in the form of a digital signal.

[Configuration of Light Emission Drive Unit]

Figure 2:
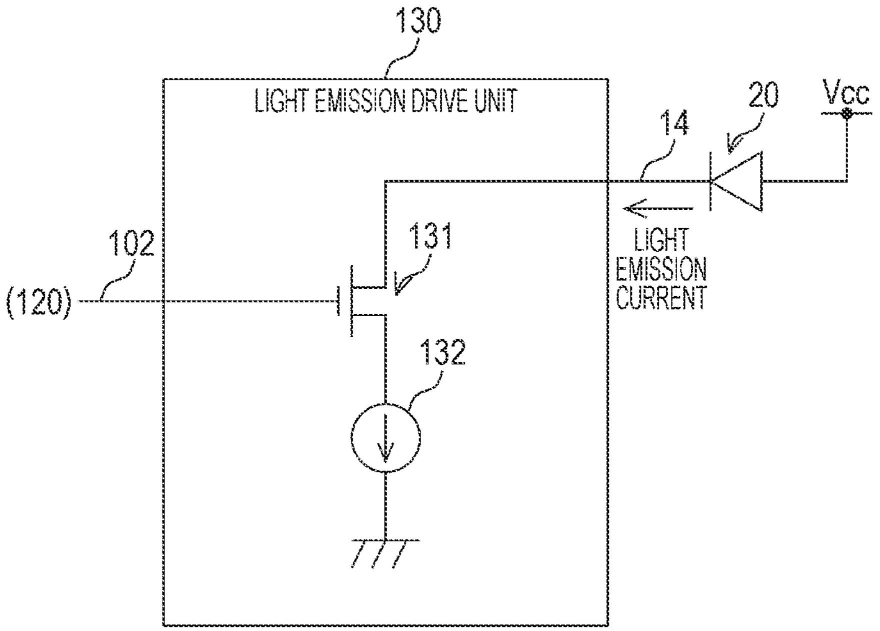
FIG. 2 illustrates a configuration example of a light emission drive unit according to the first embodiment of the present disclosure.

FIG. 2 illustrates a configuration example of the light emission drive unit according to the first embodiment of the present disclosure. FIG. 2 is a circuit diagram illustrating a configuration example of the light emission drive unit 130. The light emission drive unit 130 includes a MOS transistor 131 and a constant current circuit 132. Note that FIG. 2 also depicts the light source 20.

The gate of the MOS transistor 131 is connected to the signal line 102. The source of the MOS transistor 131 is connected to a sink-side terminal of the constant current circuit 132. A source-side terminal of the constant current circuit 132 is grounded. The drain of the MOS transistor 131 is connected to the cathode of the light source 20 via a signal line 14. The anode of the light source 20 is connected to a power supply line Vcc. In this example, the power supply line Vcc supplies power for causing a light emission current for the light source 20 to flow.

The MOS transistor 131 is a semiconductor element that supplies a light emission current to the light source 20. The MOS transistor 131 is driven by a drive signal generated by the drive signal generation unit 120. An n-channel MOS transistor can be used as the MOS transistor 131 in FIG. 2. The MOS transistor 131 is placed into a conductive state upon a drive signal having a voltage exceeding a threshold for a gate-source voltage Vgs being applied to the gate. The light emission current, i.e., a sink current, is supplied to the light source 20.

The constant current circuit 132 causes a constant current to flow. The constant current circuit 132 limits a current flowing through the light source 20 to a predetermined light emission current when the MOS transistor 131 is conductive. A constant current circuit including a MOS transistor can be used as the constant current circuit 132.

As illustrated in FIG. 2, the MOS transistor 131 is disposed within the light emission drive unit 130. The drive signal generation unit 120 generates and outputs a gate drive signal for the MOS transistor 131. As described above, a signal having an amplitude exceeding the threshold for Vgs needs to be applied to bring the MOS transistor 131 into conduction. Meanwhile, in order to cause the light source 20 to emit light fast, the MOS transistor 131 needs to transition fast between conduction and non-conduction, and the gate capacitance of the MOS transistor 131 needs to be charged or discharged fast during driving. The drive signal generation unit 120 generates a drive signal having a relatively large amplitude and short rise and fall times. Thus, a delay will occur in the period from the input of a light emission control signal by the reception unit 110 to the output of the drive signal, thereby causing a phase difference between the light emission control signal and the drive signal. The phase difference detection unit 140 detects the phase difference.

[Configuration of Phase Difference Detection Unit]

Figure 3:
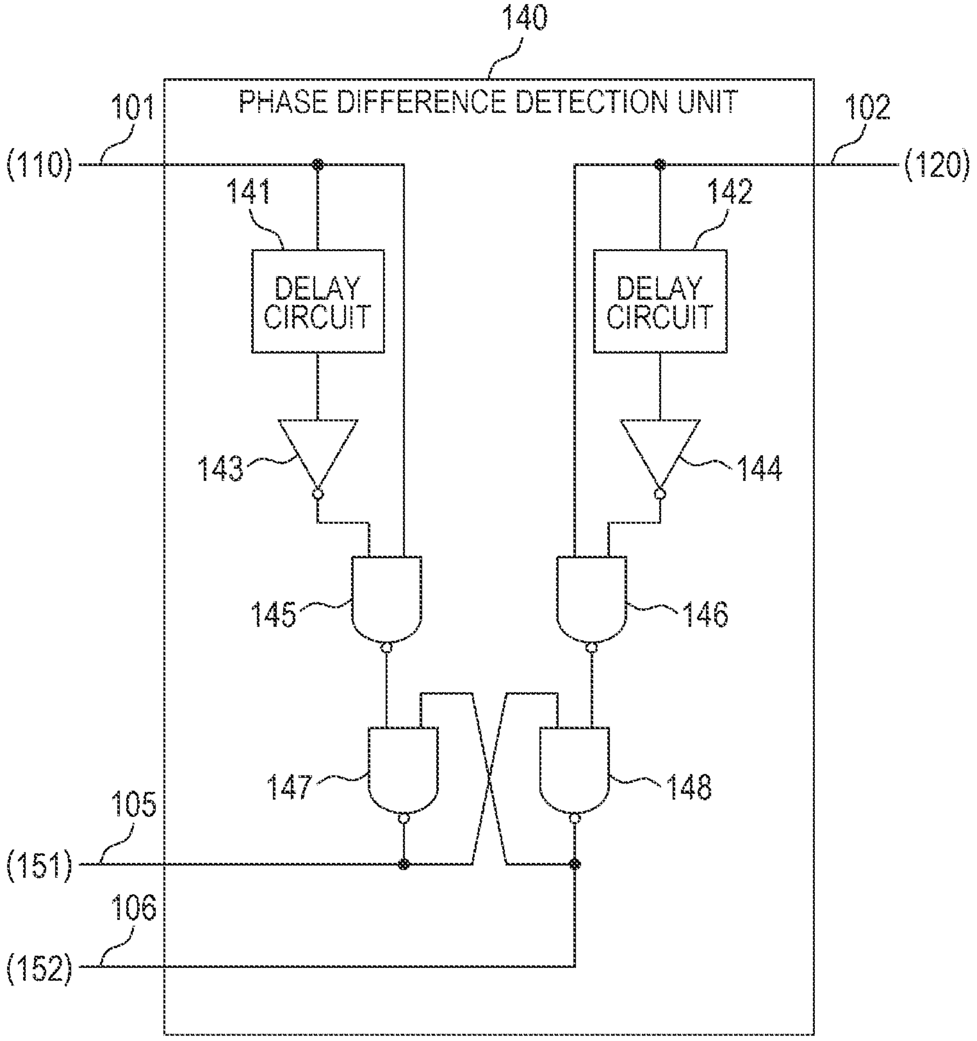
FIG. 3 illustrates a configuration example of a phase difference detection unit according to embodiments of the present disclosure.

FIG. 3 illustrates a configuration example of the phase difference detection unit according to embodiments of the present disclosure. FIG. 3 is a circuit diagram illustrating a configuration example of the phase difference detection unit 140. The phase difference detection unit 140 includes delay circuits 141 and 142, inverting gates 143 and 144, and two-input NAND gates 145 to 148.

The signal line 101 is connected to the input of the delay circuit 141. The output of the delay circuit 141 is connected to one input of the NAND gate 145 via the inverting gate 143. The signal line 101 is connected to the other input of the NAND gate 145. The signal line 102 is connected to the input of the delay circuit 142. The output of the delay circuit 142 is connected to one input of the NAND gate 146 via the inverting gate 144. The signal line 102 is connected to the other input of the NAND gate 146. The output of the NAND gate 145 is connected to one input of the NAND gate 147. The output of the NAND gate 148 is connected to the other input of the NAND gate 147. The output of the NAND gate 146 is connected to one input of the NAND gate 148. The output of the NAND gate 147 is connected to the other input of the NAND gate 148. The signal line 105 is connected to the output of the NAND gate 147. The signal line 106 is connected to the output of the NAND gate 148.

The delay circuits 141 and 142 delay input signals for a predetermined period and then output the signals. The delay circuit 141 delays a light emission control signal output from the reception unit 110. The delayed light emission control signal is inverted by the inverting gate 143 and input to the NAND gate 145, and an undelayed light emission control signal is input to the NAND gate 145. As a result, a signal synchronous with a rise of the light emission control signal and having a pulse width corresponding to the delay time of the delay circuit 141 can be generated. Similarly, a signal synchronous with a rise of a drive signal generated by the drive signal generation unit 120 is generated. These signals are input to a flip-flop circuit including the NAND gates 147 and 148. The flip-flop circuit is set by the light emission control signal and is reset by the drive signal. A signal having a pulse width corresponding to the period from the setting by the light emission control signal to the resetting by the drive signal corresponds to the phase difference between the light emission control signal and the drive signal, and is output to the signal lines 105 and 106.

Output signals of the flip-flop circuit are inversions of each other. Thus, signals through the signal lines 105 and 106 are phase difference signals with a differential. The phase difference signals with a differential are input to the delay detection unit 160 respectively via the filters 151 and 152. The phase difference detection unit 140 outputs the phase difference signals with a differential in such a manner, and an analog-to-digital conversion unit 161 (described hereinafter) performs analog-to-digital conversion of the differential signal. In this way, errors in phase difference signals resulting from a fabrication process of the light source driving device 10 or a change in, for example, the power supply voltage or temperature can be reduced.

[Configuration of Delay Detection Unit]

Figure 4:
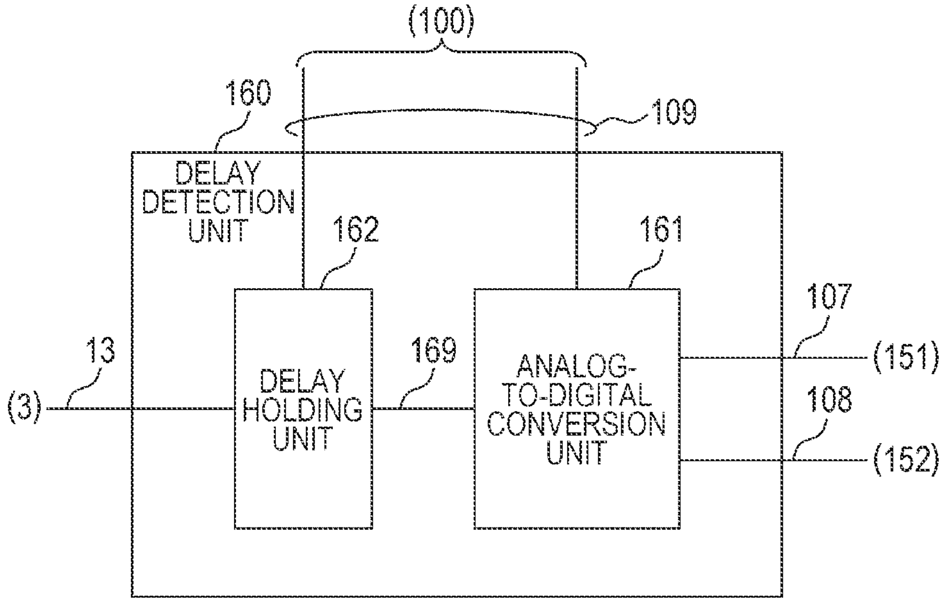
FIG. 4 illustrates a configuration example of a delay detection unit according to embodiments of the present disclosure.

FIG. 4 illustrates a configuration example of the delay detection unit according to embodiments of the present disclosure. FIG. 4 depicts a configuration example of the delay detection unit 160. The delay detection unit 160 includes an analog-to-digital conversion unit 161 and a delay holding unit 162.

The analog-to-digital conversion unit 161 converts a phase difference signal into a digital signal. The analog-to-digital conversion unit 161 in FIG. 4 converts, into digital signals, phase difference signals for which the filters 151 and 152 have attenuated high frequency components. The phase difference signals converted into digital signals are each a signal having a voltage corresponding to the phase difference between a light emission control signal and a drive signal, i.e., a signal having a voltage corresponding to the delay of the drive signal with reference to the light emission control signal. Through such a process, a delay time based on the phase difference between the light emission control signal and the drive signal can be detected.

Furthermore, a delay signal that is a digital signal corresponding to the delay time of the drive signal with reference to the light emission control signal can be generated. The delay signal is output to the delay holding unit 162 via a signal line 169. Meanwhile, the analog-to-digital conversion by the analog-to-digital conversion unit 161 is controlled by a control signal from the control unit 100.

The delay holding unit 162 holds the delay signal output from the analog-to-digital conversion unit 161. The delay holding unit 162 outputs the held delay time to the distance measuring sensor 3 at a desired timing. The delay holding unit 162 can include a register that holds a digital signal. Meanwhile, the analog-to-digital conversion unit 161 can perform a plurality of analog-to-digital conversions to generate a plurality of delay signals, and the delay holding unit 162 can hold the plurality of delay signals and output the average of the delay signals as a delay time. The delay holding unit 162 is controlled by a control signal from the control unit 100.

[Detection of Phase Difference and Delay]

Figure 5:
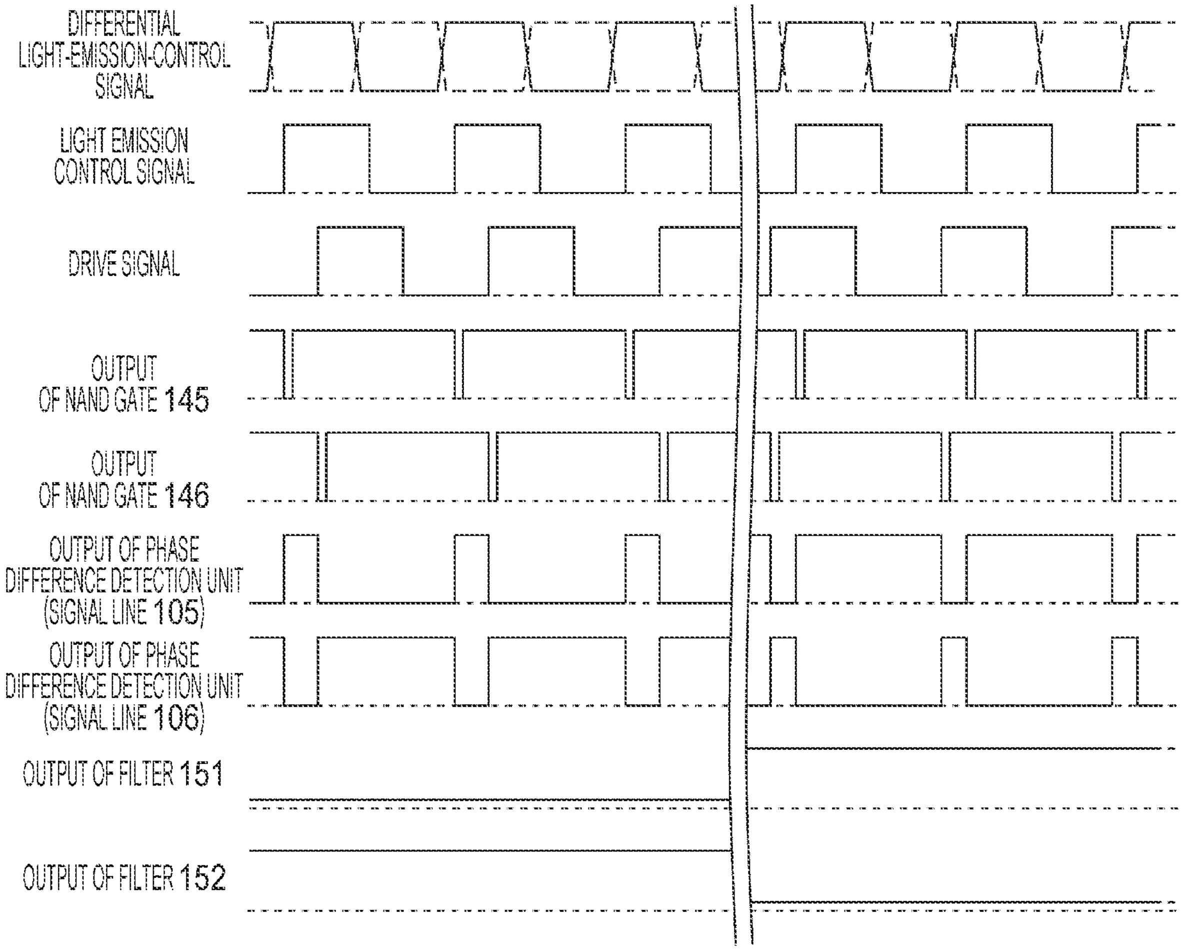
FIG. 5 illustrates an example of detection of a phase difference and a delay according to embodiments of the present disclosure.

FIG. 5 illustrates an example of detection of a phase difference and a delay according to embodiments of the present disclosure. FIG. 5 includes timing charts illustrating an example of detection of the phase difference between a light emission control signal and a drive signal that is performed by the light source driving device 10. In FIG. 5, a "differential light-emission-control signal" indicates a differential light-emission-control signal transferred through the signal line 11 and input to the reception unit 110. A "light emission control signal" indicates a light emission control signal output from the reception unit 110. A "drive signal" indicates a drive signal output from the drive signal generation unit 120. "Output of NAND gate 145" and "output of NAND gate 146" respectively indicate output signals of the NAND gates 145 and 146 described above by referring to FIG. 3. "Output of phase difference detection unit (signal line 105)" indicates an output signal of the phase difference detection unit 140 output to the signal line 105. "Output of phase difference detection unit (signal line 106)" indicates an output signal of the phase difference detection unit 140 output to the signal line 106. "Output of filter 151" and "output of filter 152" respectively indicate output signals of the filters 151 and 152.

Note that a solid line and a dotted line for the "differential light-emission-control signal" in FIG. 5 indicate two differential signals. Meanwhile, the "light emission control signal", "drive signal", "output of NAND gate 145", "output of NAND gate 146", and "output of phase difference detection unit" in FIG. 5 are represented by binary signal waveforms. Furthermore, dotted lines in FIG. 5 indicate a level of 0 V.

The differential light-emission-control signal output from the distance measuring sensor 3 is converted into a single-ended light emission control signal by the reception unit 110. As illustrated in FIG. 5, rectangular waves having a duty ratio of 50% can be used as the light emission control signal. The drive signal is generated and output upon the light emission control signal being input to the drive signal generation unit 120. As illustrated in FIG. 5, the drive signal has a phase delayed by a delay time with reference to the light emission control signal. The light emission control signal and the drive signal are input to the phase difference detection unit 140, and pulse signals synchronous with rises of the respective signals are output from the NAND gates 145 and 146.

The pulse signals are input to the NAND gates 147 and 148 forming the flip-flop circuit. In synchronization with a fall of the output signal of the NAND gate 145, the output signal of the NAND gate 147 (signal through the signal line 105) and the output signal of the NAND gate 148 (signal through the signal line 106) transition to value "1" and value "0", respectively. Then, in synchronization with a fall of the output signal of the NAND gate 146, the output signal of the NAND gate 147 (signal through the signal line 105) and the output signal of the NAND gate 148 (signal through the signal line 106) are inverted and thus transition to value "0" and value "1", respectively.

The first half in FIG. 5 represents a situation in which the delay of the drive signal with reference to the light emission control signal is relatively small. The second half represents a situation in which the delay of the drive signal with reference to the light emission control signal is relatively large. The differential output signals of the phase difference detection unit 140 have a pulse width corresponding to the delay time of the drive signal with reference to the light emission control signal. Inputting the output signals of the phase difference detection unit 140 to the filters 151 and 152 and attenuating the high frequency components thereof will result in these signals being converted into differential signals having a voltage corresponding to the pulse width of the output signals of the phase difference detection unit 140. A delay based on the phase difference between the light emission control signal and the drive signal can be detected by performing analog-to-digital conversion of the output signals of the filters 151 and 152.

[Detection of Distance]

Figure 6A:
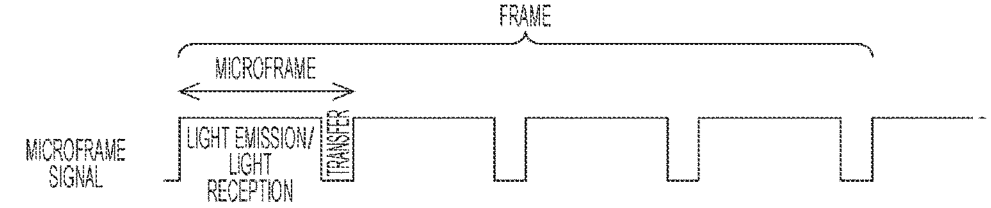
FIG. 6 illustrates an example of detection of a distance according to embodiments of the present disclosure.
Figure 6B:
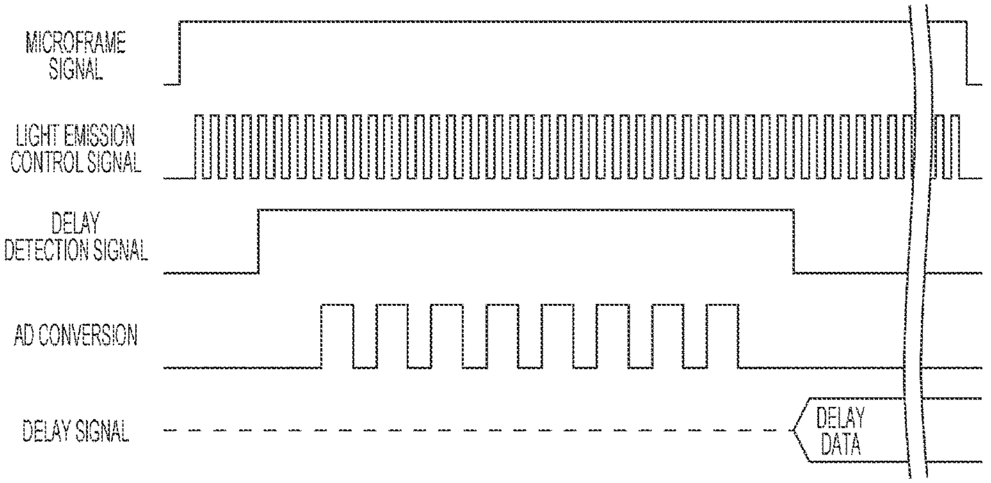

FIG. 6 illustrates an example of detection of a distance according to embodiments of the present disclosure. FIG. 6 includes timing charts illustrating examples of the driving of the light source 20 and delay detection that are performed in the light source device 4.

A in FIG. 6 indicates microframes for measuring the distance to an object. The distance is measured by acquiring images corresponding to one screen through a process in which the distance measuring sensor 3 receives reflected light from the object while the light source device 4 is being caused to emit light. The period required to acquire the images corresponds to a microframe. A "microframe signal" in A in FIG. 6 indicates the separations between microframes, images are generated during periods with a value of "1", and data on the generated images is transferred during periods with a value of "0". Note that the microframe signal is an internal signal of the distance measuring sensor 3.

The distance can be measured using a plurality of microframes associated with different conditions or the like for image generation. For example, the phases of light emission by the light source device 4 and light reception by the distance measuring sensor 3 may be set to 0°, 90°, 180°, and 270° for each microframe, so as to generate four images. Next, the phase difference between the light emitted from the light source device 4 and the light reflected from the object can be calculated from the four images to measure the distance to the object. Details of the distance measurement will be described hereinafter.

The periods of the four microframes form a frame for measuring the distance to the object. This frame can be repeated a plurality of times, and the average of distances obtained by a plurality of frames can be defined as the distance to the object.

B in FIG. 6 illustrates an example of delay detection for each microframe. A "light emission control signal" in B in FIG. 6 indicates a light emission control signal output from the reception unit 110. A "delay detection signal" instructs the light source driving device 10 to detect a delay. The "delay detection signal" is an example of the control signal described above by referring to FIG. 1 that is output from the distance measuring sensor 3 via the signal line 12. An "AD conversion signal", which is a control signal output from the control unit 100 to the analog-to-digital conversion unit 161 of the delay detection unit 160, gives an instruction to perform analog-to-digital conversion. A "delay output" indicates a delay signal output from the light source driving device 10.

When the microframe signal reaches value "1", a differential light-emission-control signal in the form of a pulse train is output from the distance measuring sensor 3. The output differential light-emission-control signal is received and converted by the reception unit 110 into a light emission control signal, which is output to the drive signal generation unit 120 and the phase difference detection unit 140. After differential light-emission-control signals with a predetermined number of pulses are output, the distance measuring sensor 3 outputs a delay detection signal having a value of "1". Upon the delay detection signal being output, the control unit 100 outputs an AD conversion signal having a value of "1" to the analog-to-digital conversion unit 161. Upon the AD conversion signal being input, the analog-to-digital conversion unit 161 performs analog-to-digital conversion of phase difference signals output from the filters 151 and 152. The delay time of the digital signals generated through the analog-to-digital conversion is held in the delay holding unit 162.

B in FIG. 6 illustrates an example in which analog-to-digital conversion is performed eight times. The control unit 100 outputs an AD conversion signal eight times. Every time the AD conversion signal is input, the analog-to-digital conversion unit 161 performs analog-to-digital conversion and outputs a detected delay time to the delay holding unit 162. The delay holding unit 162 holds the plurality of delay times. Then, when delay detection signals stop being output, the delay holding unit 162 generates delay data by calculating the average of the plurality of delay times that have been held, and outputs the delay data to the distance measuring sensor 3 via the signal line 13.

Furthermore, when the microframe signal reaches value "1", the distance measuring sensor 3 starts to detect reflected light, and an image signal based on the reflected light is generated. The image signal is generated by an imaging element 350 (described hereinafter) disposed in the distance measuring sensor 3. The imaging element 350 performs photoelectric conversion of the reflected light and generates an image signal on the basis of the charge generated through the photoelectric conversion. In this situation, during a period in which the value of the microframe signal is "1", the imaging element 350 accumulates the charge generated through photoelectric conversion; and when the microframe signal reaches value "0", the imaging element 350 generates an image signal on the basis of accumulated image signals and outputs (transfers) the generated image signal to an image processing unit 360 (described hereinafter). The object is detected by the image processing unit 360, and the time from the light emission to the detected object by the light source driving device 10 to the detection of reflected light is measured. The distance is measured by subtracting, from the measured time, the delay time that is based on the delay signal output by the delay holding unit 162. Owing to the subtraction of the delay time, an error based on a delay in light emission by the light source driving device 10 can be reduced.

As described above, the light source driving device 10 according to the first embodiment of the present disclosure detects a delay in light emission from the light source 20 by detecting the phase difference between a light emission control signal input to the drive signal generation unit 120 and a drive signal output from the drive signal generation unit 120. An error in the distance measurement can be reduced by correcting the distance to the object by using the detected delay.

2. Second Embodiment

The light source driving device 10 according to the first embodiment detects a delay in the drive signal generation unit 120. By contrast, the light source driving device 10 according to the second embodiment of the present disclosure further detects a delay in the reception unit and, in this respect, is different from the first embodiment.

[Configuration of Light Source Device]

Figure 7:
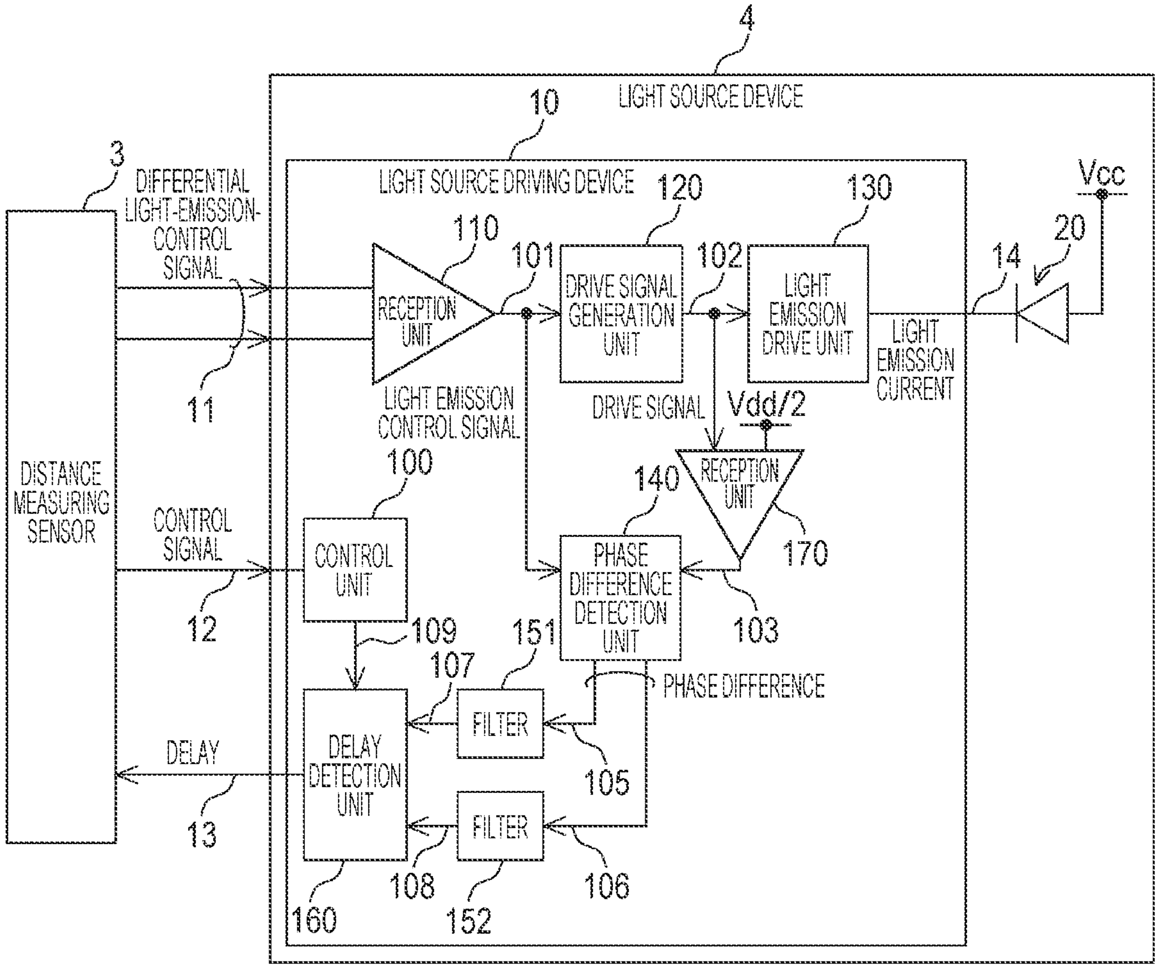
FIG. 7 illustrates a configuration example of a light source device according to a second embodiment of the present disclosure.

FIG. 7 illustrates a configuration example of a light source device according to the second embodiment of the present disclosure. As with FIG. 1, FIG. 7 depicts a configuration example of the light source device 4. This configuration differs from the light source device 4 described above by referring to FIG. 1 in that a reception unit 170 is further disposed between the drive signal generation unit 120 and the phase difference detection unit 140 of the light source driving device 10.

The reception unit 170 has similar delay characteristics to the reception unit 110. The non-inverting input of the reception unit 170 is connected to the signal line 102. The inverting input of the reception unit 170 is connected to a power supply line Vdd/2. The output of the reception unit 170 is connected to a signal line 103. The power supply line Vdd/2 supplies power having a voltage that is ½ of the power supply voltage of the reception unit 170. The reception unit 170 is operated as a non-inverting buffer since the voltage that is ½ of the power supply voltage is applied to the inverting input. Meanwhile, the signal line 103 is also connected to inputs of the delay circuit 142 and the NAND gate 146 described above by referring to FIG. 3. A drive signal is input to the phase difference detection unit 140 in FIG. 7 via the reception unit 170. Thus, the phase difference detection unit 140 in FIG. 7 detects a phase difference that is based on delays in the drive signal generation unit 120 and the reception unit 170. The reception unit 170 has, as described above, similar delay characteristics to the reception unit 110, so the light source driving device 10 in FIG. 7 can detect delays in the reception unit 110 and the driving.

In terms of the other features, the configuration of the light source driving device 10 is similar to the configuration of the light source driving device 10 described above by referring to the first embodiment of the present disclosure, and descriptions of these features are omitted herein.

The light source driving device 10 according to the second embodiment of the present disclosure includes, as described above, the reception unit 170 disposed between the drive signal generation unit 120 and the phase difference detection unit 140 so as to delay the drive signal, so that the delay time of the reception unit 110 can be detected. An error in the distance measurement can be further reduced.

3. Third Embodiment

The light source driving device 10 according to the first embodiment detects the phase difference between a light emission control signal and a drive signal. By contrast, the light source driving device 10 according to the third embodiment of the present disclosure detects the phase difference between a light emission control signal and a signal that is based on a light emission current of the light source 20, and, in this respect, is different from the first embodiment.

[Configuration of Light Emission Drive Unit]

Figure 8:
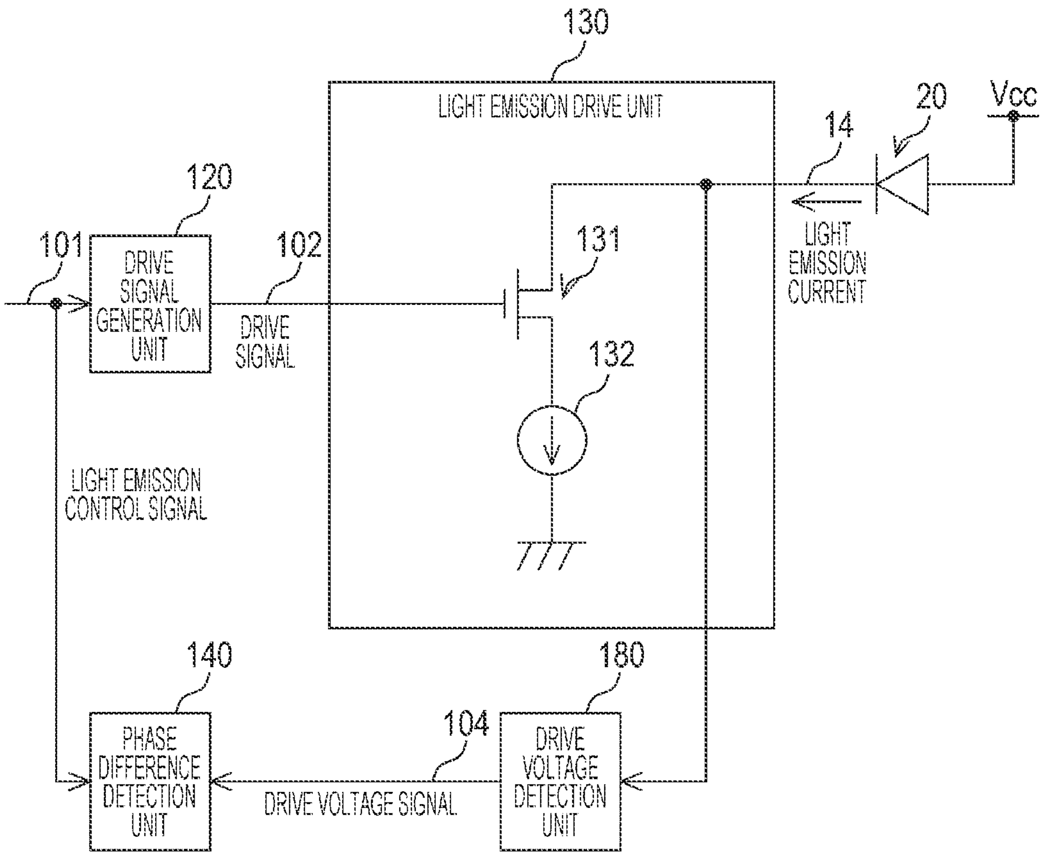
FIG. 8 illustrates a configuration example of a light emission drive unit according to a third embodiment of the present disclosure.

FIG. 8 illustrates a configuration example of the light emission drive unit according to the third embodiment of the present disclosure. As with FIG. 2, FIG. 8 is a circuit diagram illustrating a configuration example of the light emission drive unit 130. The light emission drive unit 130 in FIG. 8 is different from the light emission drive unit 130 in FIG. 2 in that connections to the drive signal generation unit 120 and the phase difference detection unit 140 are described.

The phase difference detection unit 140 in FIG. 8 detects the phase difference between a light emission control signal and a drive voltage signal. In this example, the drive voltage signal, which indicates a light emission period of the light source 20, is generated on the basis of a light emission current.

The drive voltage detection unit 180 generates a drive voltage signal. The drive voltage detection unit 180 converts the drain voltage of the MOS transistor 131, which is acquired via the signal line 14, into a voltage having a signal level of a logic circuit of the phase difference detection unit 140, and inverts the logic, thereby generating a drive voltage signal. The generated drive voltage signal is input to the phase difference detection unit 140 via a signal line 104.

In the light emission drive unit 130, a delay time arises in the period from the input of a drive signal to the supply of a light emission current to the light source 20. This is because the MOS transistor 131 needs a time to transition to the conductive state. Accordingly, the drain voltage of the MOS transistor 131 is detected to generate a drive voltage signal, and the drive voltage signal is input to the phase difference detection unit 140 so that the delay time of the light emission drive unit 130 can be detected.

In terms of the other features, the configuration of the light source driving device 10 is similar to the configuration of the light source driving device 10 described above by referring to the first embodiment of the present disclosure, and descriptions of these features are omitted herein.

As described above, the light source driving device 10 according to the third embodiment of the present disclosure detects the phase difference from a light emission control signal by generating a drive voltage signal from the drain voltage of the MOS transistor 131 of the light emission drive unit 130. As a result, the delay time of the light emission drive unit 130 can be detected, and an error in the distance measurement can be further reduced.

4. Fourth Embodiment

The light source driving device 10 according to the third embodiment detects the phase difference between a light emission control signal and a drive voltage signal. By contrast, the light source driving device 10 according to the fourth embodiment of the present disclosure detects the phase difference between a light emission control signal and light emission from the light source 20, and, in this respect, is different from the third embodiment.

[Configuration of Light Emission Drive Unit]

Figure 9:
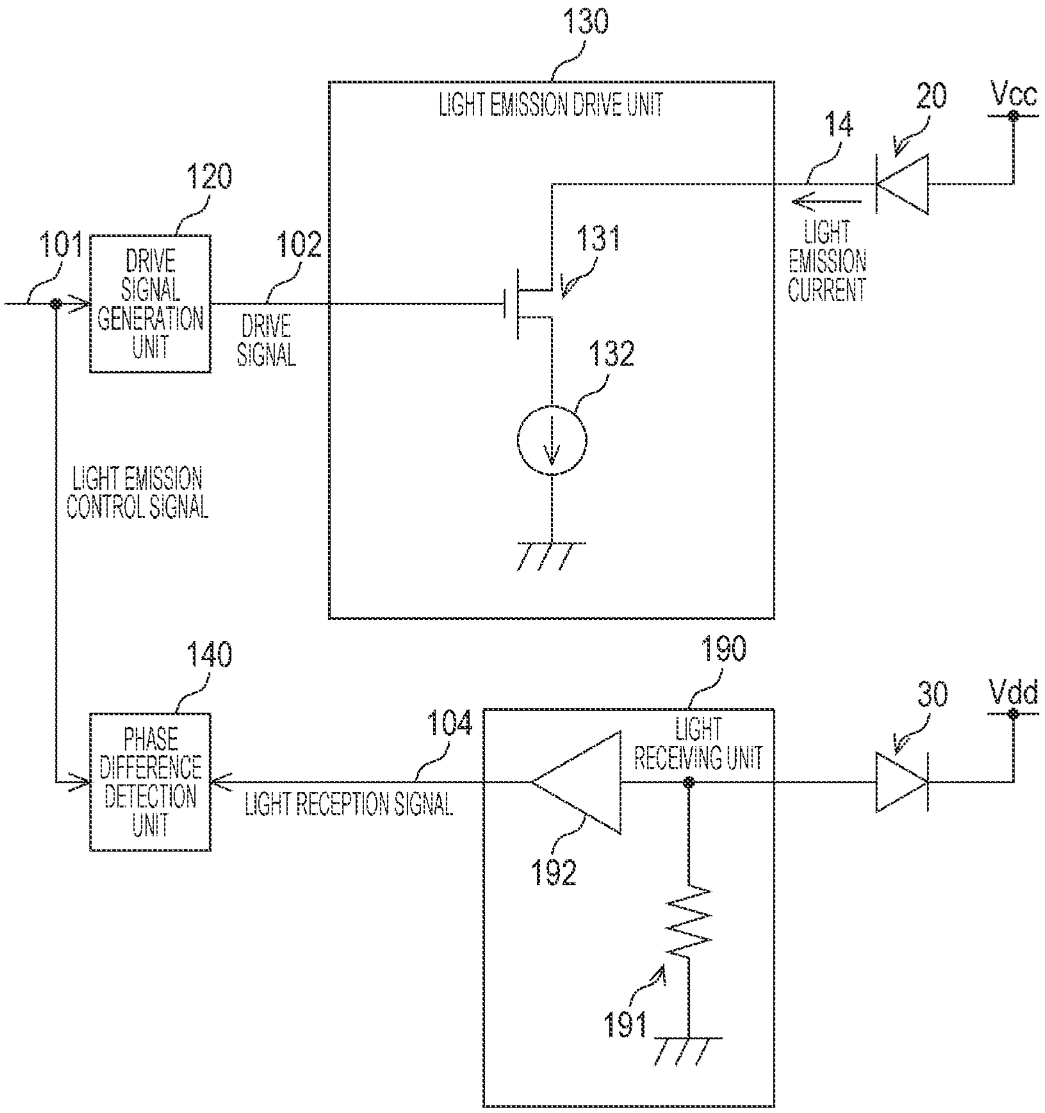
FIG. 9 illustrates a configuration example of a light emission drive unit according to a fourth embodiment of the present disclosure.

FIG. 9 illustrates a configuration example of the light emission drive unit according to the fourth embodiment of the present disclosure. As with FIG. 8, FIG. 9 is a circuit diagram illustrating a configuration example of the light emission drive unit 130. The configuration is different from the light emission drive unit 130 in FIG. 8 in that a light receiving element 30 and a light receiving unit 190 are provided in place of the drive voltage detection unit 180.

The phase difference detection unit 140 in FIG. 9 detects the phase difference between a light emission control signal and a light reception signal. In this example, the light reception signal, which indicates a light emission period of the light source 20, is generated by detecting light emission from the light source 20.

The light receiving element 30 receives light from the light source 20. The light receiving element 30 performs light reception by converting a change in emitted light into an electric signal. For example, the light receiving element 30 can include a light receiving diode. The light receiving element 30 in FIG. 9 includes a cathode connected to a power supply line Vdd so as to be supplied with power. A current corresponding to the amount of received light flows through the light receiving element 30.

The light receiving unit 190 detects light emission from the light source 20. The light receiving unit 190 includes a resistor 191 and a non-inverting buffer 192. The input of the non-inverting buffer 192 is connected to the anode of the light receiving element 30 and one end of the resistor 191. The other end of the resistor 191 is grounded. The output of the non-inverting buffer 192 is connected to the signal line 104. As described above, a current corresponding to the amount of received light flows through the light receiving element 30. The resistor 191 converts a change in the current into a voltage change. The voltage change is amplified by the non-inverting buffer 192 and output as a light reception signal.

The light source 20 has a delay time in the period from supply of a light emission current to emission of light. This is because the start of oscillation of laser light is accompanied by a delay time. Accordingly, the light receiving element 30 and the light receiving unit 190 are disposed to directly detect light emission from the light source 20 and generate a light reception signal. Inputting the light reception signal to the phase difference detection unit 140 allows the delay time of the light emission drive unit 130 and the light source 20 to be detected.

In terms of the other features, the configuration of the light source driving device 10 is similar to the configuration of the light source driving device 10 described above by referring to the third embodiment of the present disclosure, and descriptions of these features are omitted herein.

As described above, the light source driving device 10 according to the fourth embodiment of the present disclosure detects light from the light source 20 so as to generate a light reception signal and detect the phase difference from a light emission control signal. As a result, the delay time of the light emission drive unit 130 and the light source 20 can be detected, and an error in the distance measurement can be further reduced.

<5. Distance Measuring Sensor>

The following describes the configuration of the distance measuring sensor 3 applied to the distance measuring device.

[Configuration of Distance Measuring Sensor]

Figure 10:
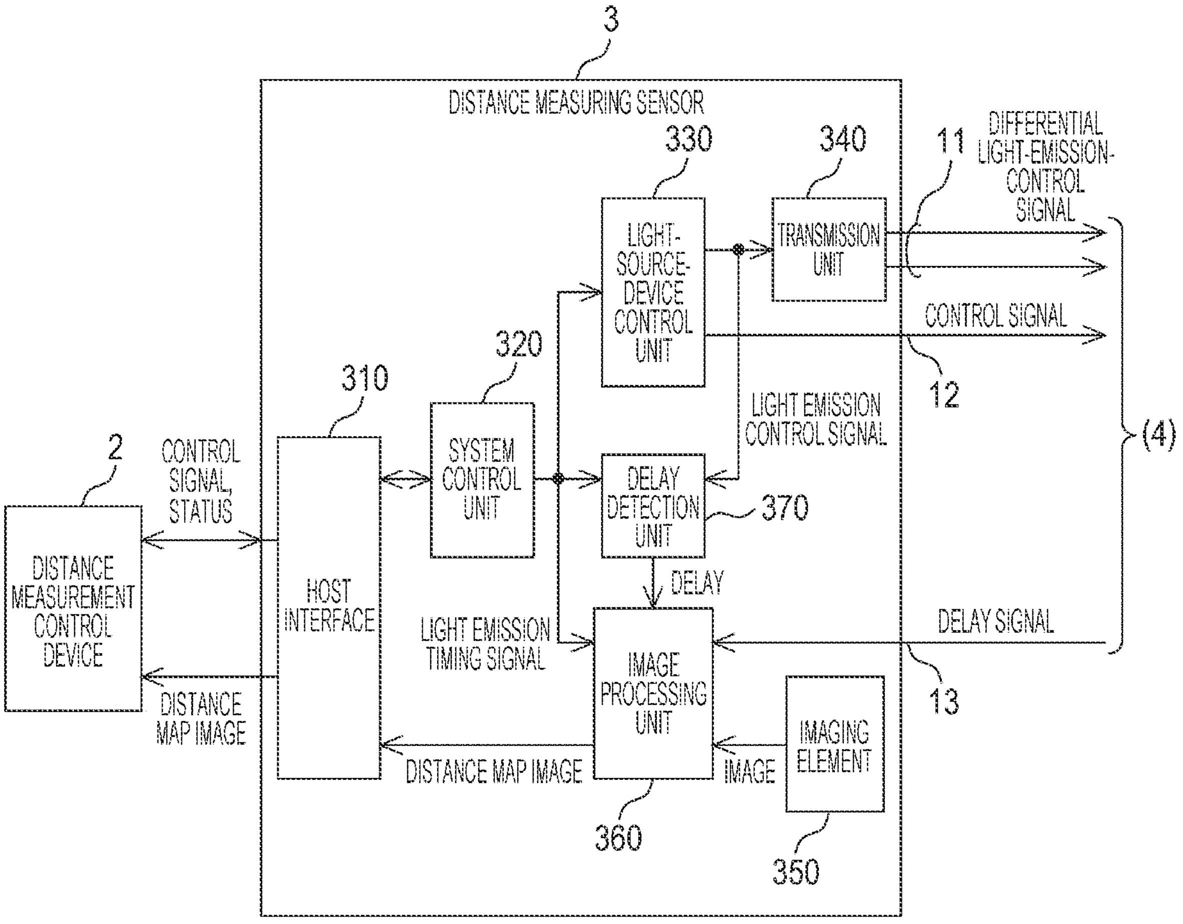
FIG. 10 illustrates a configuration example of a distance measuring sensor according to embodiments of the present disclosure.

FIG. 10 illustrates a configuration example of the distance measuring sensor according to embodiments of the present disclosure. FIG. 10 depicts a configuration example of the distance measuring sensor 3. The distance measuring sensor 3 in FIG. 10 measures the distance to an object on the basis of an instruction from a distance measurement control device 2, and outputs a measurement result to the distance measurement control device 2. For example, an application processor can be used for the distance measurement control device 2.

The distance measuring sensor 3 includes a host interface unit 310, a system control unit 320, a light-source-device control unit 330, a transmission unit 340, an imaging element 350, an image processing unit 360, and a delay detection unit 370.

The host interface unit 310 communicates with the distance measurement control device 2. The distance measurement control device 2 outputs a control signal. The distance measuring sensor 3 outputs a status indicating the state thereof and outputs a distance map image (described hereinafter) to the distance measurement control device 2. The communication of the signals is performed by the host interface unit 310.

The system control unit 320 controls the entirety of the distance measuring sensor 3 and controls distance measurement on the basis of a control signal output from the distance measurement control device 2. The system control unit 320 generates a light emission timing signal indicating a light emission timing of the light source device 4, and outputs the light emission timing signal to the light-source-device control unit 330, the image processing unit 360, and the delay detection unit 370.

The light-source-device control unit 330 controls the light source device 4. The light-source-device control unit 330 generates a light emission control signal on the basis of the light emission timing signal output from the system control unit 320, and outputs the light emission control signal to the transmission unit 340. Furthermore, the light-source-device control unit 330 generates the control signal described above by referring to FIG. 1, and outputs the control signal to the control unit 100 via the signal line 12.

The transmission unit 340 converts a light emission control signal into a differential light-emission-control signal, i.e., a differential signal, and transmits the differential signal to the light source device 4 via the signal line 11.

The delay detection unit 370 detects a delay in the light-source-device control unit 330. The delay detection unit 370 detects a delay in the light-source-device control unit 330 on the basis of the phase difference between a light emission timing signal and a light emission control signal. The detected delay is output to the image processing unit 360.

The imaging element 350 is a semiconductor element that captures an image. The imaging element 350 captures an image of an object, i.e., generates an image of the object. The generated image is output to the image processing unit 360.

The image processing unit 360 processes an image output from the imaging element 350. The image processing unit 360 detects the distance to the object unit on the basis of the image output from the imaging element 350. Specifically, the image processing unit 360 starts to measure time upon a light emission timing signal being output from the system control unit 320. Thereafter, reflected light is detected on the basis of the image from the imaging element 350, and the measuring of time stops. The distance to the object is detected according to the time of flight of light that has been measured. In this situation, the image processing unit 360 subtracts the delay detected by the light source driving device 10 and the delay detected by the delay detection unit 370 from the time of flight of light that has been measured. In this way, an error based on the delays in the light source driving device 10 and the light-source-device control unit 330 can be reduced. Furthermore, the image processing unit 360 can generate a distance map image on the basis of the distance to the object. The three-dimensional shape of the object can be obtained from the distance map image. The image processing unit 360 outputs the generated distance map image to the distance measurement control device 2.

Note that the imaging element 350 is an example of the sensor set forth in the claims. The image processing unit 360 is an example of the processing circuit set forth in the claims. The distance measuring sensor 3 is an example of the distance measuring device set forth in the claims.

[Configuration of Delay Detection Unit]

Figure 11:
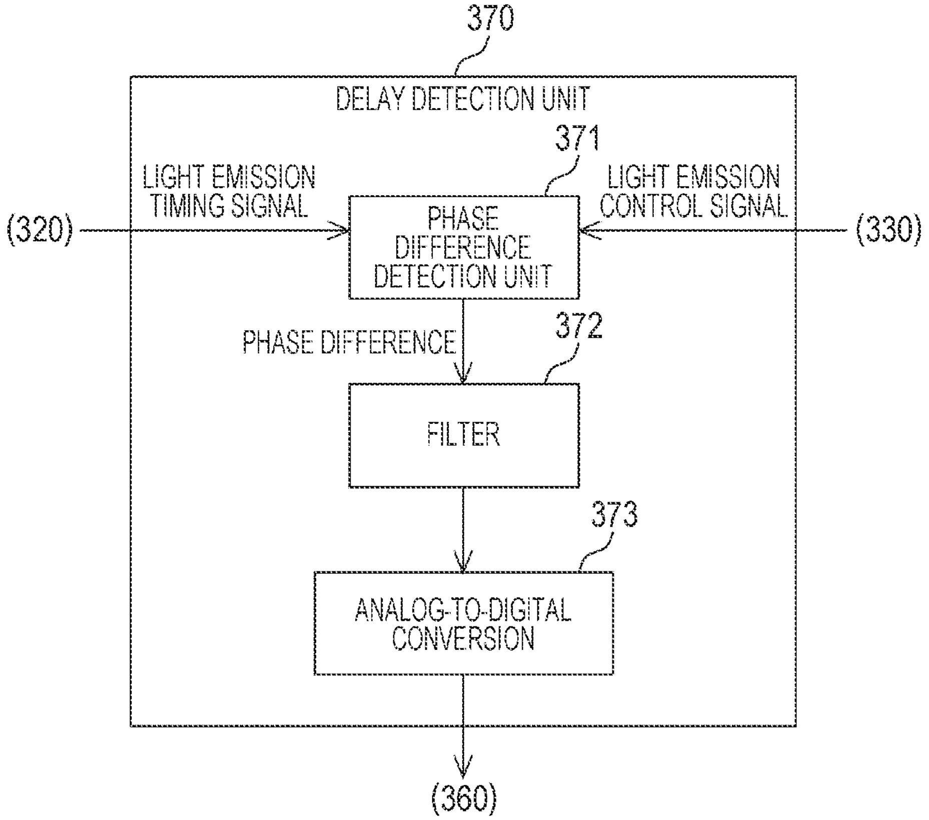
FIG. 11 illustrates a configuration example of a delay detection unit according to embodiments of the present disclosure.

FIG. 11 illustrates a configuration example of the delay detection unit according to embodiments of the present disclosure. FIG. 11 depicts a configuration example of the delay detection unit 370. The delay detection unit 370 includes a phase difference detection unit 371, a filter 372, and an analog-to-digital conversion unit 373.

The phase difference detection unit 371 detects the phase difference between a light emission timing signal output from the system control unit 320 and a light emission control signal output from the light-source-device control unit 330. The detected phase difference is output to the filter 372.

The filter 372 attenuates the high frequency components of the phase difference output from the phase difference detection unit 371. The phase difference in which high frequency components have been attenuated is output to the analog-to-digital conversion unit 373.

The analog-to-digital conversion unit 373 performs analog-to-digital conversion of the phase difference in which high frequency components have been attenuated, thereby generating a delay time of a digital signal. The generated delay time is output to the image processing unit 360.

Note that the configuration of the distance measuring sensor 3 is not limited to this example. For example, the delay detection unit 370 can be omitted. In this case, the image processing unit 360 corrects the time of flight of light on the basis of a delay output from the light source driving device 10.

As described above, the distance measuring sensor 3 of the present disclosure detects a delay in the light-source-device control unit 330 in addition to the delay time of the light source driving device 10, and subtracts the delays from the time of flight of light. In this way, an error in the distance measurement can be reduced.

Note that the configuration of the light source driving device 10 according to the second embodiment can be combined with other embodiments. Specifically, the configuration of the light source driving device 10 in FIG. 7 can be applied to the light source driving devices 10 according to the third and fourth embodiments.

<6. Distance Measuring Device>

The following describes a distance measuring device using the light source device 4 and the distance measuring sensor 3.

[Configuration of Distance Measuring Device]

Figure 12:
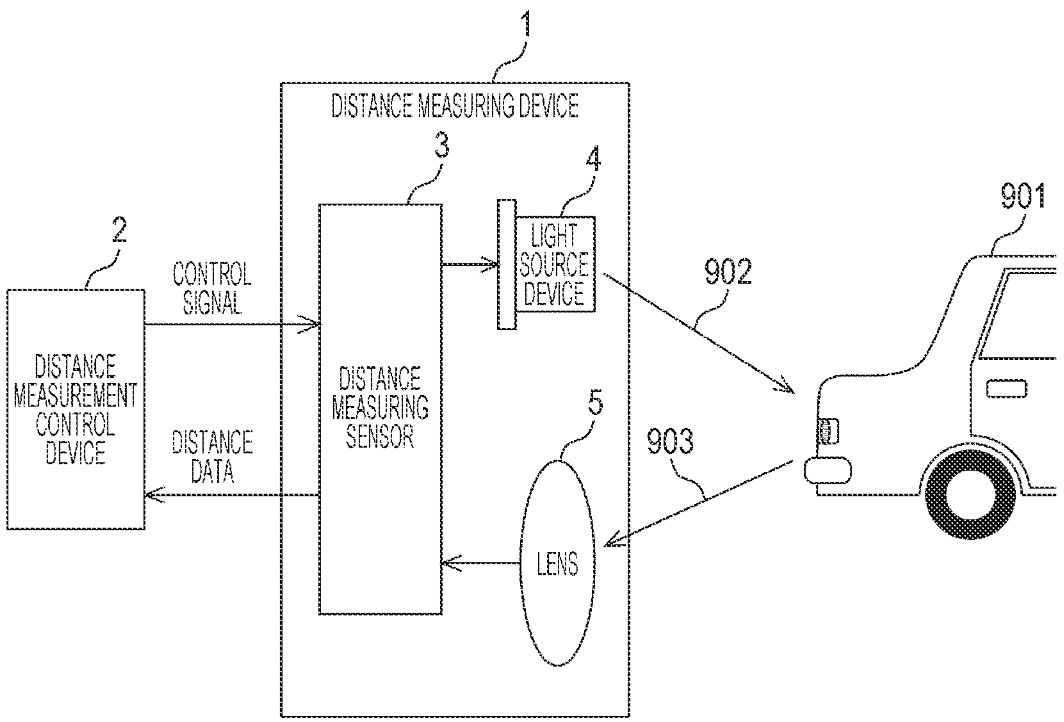
FIG. 12 illustrates a configuration example of a distance measuring device according to embodiments of the present disclosure.

FIG. 12 illustrates a configuration example of the distance measuring device according to embodiments of the present disclosure. FIG. 12 is a block diagram illustrating a configuration example of the distance measuring device 1. The distance measuring device 1 in FIG. 12 includes the distance measuring sensor 3, the light source device 4, and a lens 5. Note that FIG. 12 also depicts the distance measurement control device 2 and an object 901 to be subjected to distance measurement.

The lens 5 forms an image of the object on the imaging element 350 of the distance measuring sensor 3.

The distance measuring sensor 3 in FIG. 12 controls the light source device 4 so as to cause the light source device 4 to emit an emitted light 902 to the object 901. The emitted light 902 is reflected from the object 901 as reflected light 903. Upon detecting the reflected light 903, the distance measuring sensor 3 measures the time from the emission of the emitted light 902 to the detection of the reflected light 903, so as to measure the distance to the object 901. The measured distance is output to the distance measurement control device 2 as distance data.

[Distance Measuring Process]

Figure 13A:
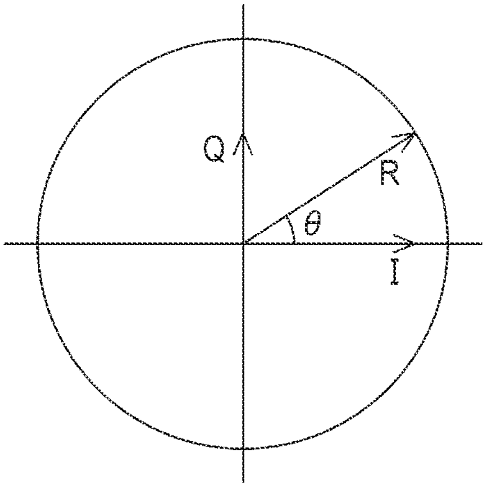
FIG. 13 illustrates an example of distance measurement according to embodiments of the present disclosure.
Figure 13B:
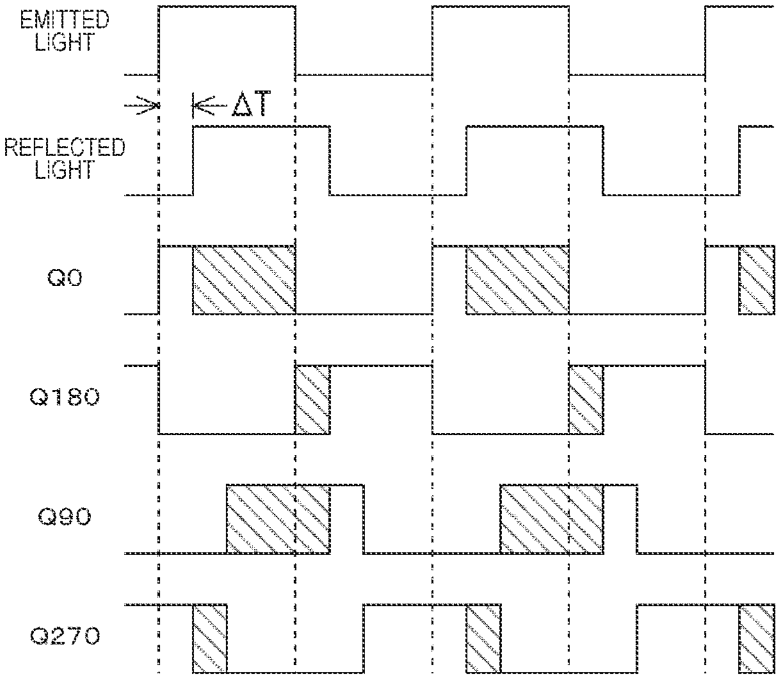

FIG. 13 illustrates an example of distance measurement according to embodiments of the present disclosure. A in FIG. 13 illustrates a relationship between emitted light from the light source device 4 and reflected light from an object. A positive x-axis direction in A in FIG. 13 corresponds to the phase of the emitted light. "R" in A in FIG. 13 indicates reflected light. The emitted light and the reflected light R have therebetween a phase difference θ corresponding to a distance. The distance to the object can be measured by detecting the phase difference θ. In this example, "I" indicates a component in phase with the emitted light, and "Q" indicates a component orthogonal to the emitted light. The phase difference θ can be expressed by the following formula.

$$\theta = \arctan(Q/I)$$

In this formula, I indicates a peak value of reflected light in phase with the emitted light. Q indicates a peak value of orthogonal reflected light. A in FIG. 13 is based on the premise of, for example, emitted light having sine waves. In the case of, for example, emitted light having pulse waves, however, θ can also be calculated using the formula. This can be implemented by detecting the reflected light at a plurality of timings at which a phase difference of 90 degrees from the emitted light is made. B in FIG. 13 indicates this scheme.

The "emitted light" and the "reflected light" in B in FIG. 13 indicate the waveforms of the emitted light and the reflected light, respectively. The reflected light has a waveform delayed by ΔT with reference to the emitted light. ΔT is the time required to travel to the object and back therefrom. The distance D to the object can be expressed by the following formula.

$$D = c \times \Delta T/2 = c \times \theta/(4\pi \times f)$$

In this formula, c indicates the speed of light. f indicates the frequency of the emitted light.

Meanwhile, "Q0", "Q180", "Q90", and "Q270" in B in FIG. 13 indicate situations in which the reflected light is detected at different phases from the emitted light by 0, 180, 90, and 270 degrees, respectively. The reflected light is detected in the periods of value "1" in the waveforms in "Q0" and the others. Portions of the waveforms in "Q0" and the others that are hatched using oblique lines indicate detected reflected light. According to "Q0" and the others, I and Q can be expressed as follows.

$$I = Q0 - Q180$$

$$Q = Q90 - Q270$$

Thus, θ can be expressed by the following formula.

$$\theta = \arctan((Q90 - Q270)/(Q0 - Q180))$$

The distance D to the object can be calculated by substituting θ into the above formula.

The above descriptions of embodiments are intended for examples of the present disclosure, and the present disclosure is not limited to the described embodiments. Thus, various changes can be made as a matter of course according to, for example, design without departing from the technical idea of the present disclosure, even in a case where such changes provide embodiments that are not described herein.

Meanwhile, the effects described herein are nothing but examples and are not limiting. In addition, other effects are also possible.

Furthermore, the drawings pertaining to the described embodiments are schematic, and the ratios between the sizes of components and the like do not necessarily match actual ones. In addition, it is needless to say that the drawings include portions having different relationships and ratios in size.

Furthermore, the processing procedures described above by referring to embodiments may be deemed as methods including the series of procedures, or may be deemed as programs for causing a computer to execute the series of procedures, or as a recording medium storing the programs. For example, a compact disc (CD), a digital versatile disc (DVD), a memory card, and the like can be used as the recording medium.

Note that the present technology can also have the following configurations.

(1) A light source driving device including:

a light emission drive unit that supplies a light emission current for causing a light source to emit light;

a drive signal generation unit that generates a drive signal for driving the light emission drive unit on the basis of a light emission control signal for causing the light source to emit light;

a phase difference detection unit that detects a phase difference between a light emission period of the light source and the light emission control signal; and a delay detection unit that detects a delay in the light emission on the basis of the detected phase difference.

(2) The light source driving device according to (1), in which the phase difference detection unit detects the phase difference from the light emission control signal, with the drive signal being defined as the light emission period of the light source.

(3) The light source driving device according to (1), in which the phase difference detection unit detects the phase difference from the light emission control signal, with a signal based on the light emission current being defined as the light emission period of the light source.

(4) The light source driving device according to (1), further including a light receiving unit that detects the light emission from the light source, in which the phase difference detection unit detects the phase difference from the light emission control signal, with a period of the detected light emission being defined as the light emission period of the light source.

(5) The light source driving device according to any of (1) to (4), in which the phase difference detection unit outputs a differential signal corresponding to the detected phase difference, and the delay in the light emission is detected on the basis of the differential signal output from the phase difference detection unit.

(6) The light source driving device according to any of (1) to (5), further including a filter that attenuates high frequency components of the detected phase difference, in which the delay detection unit detects the delay on the basis of the phase difference in which the high frequency components have been attenuated.

(7) The light source driving device according to any of (1) to (6), further including a reception unit that receives the light emission control signal, which is transferred through a signal line path, and outputs the received light emission control signal, in which the drive signal generation unit generates the drive signal on the basis of the light emission control signal output from the reception unit, and the phase difference detection unit detects a phase difference between the light emission period of the light source and the light emission control signal output from the reception unit.

(8) The light source driving device according to (7), in which the signal line path transfers a differential light-emission-control signal provided by converting the light emission control signal into a differential signal, and the reception unit receives and converts the transferred differential light-emission-control signal into the light emission control signal.

(9) The light source driving device according to (7), further including a second reception unit to which the generated drive signal is input, in which the phase difference detection unit detects a phase difference between the light emission period of the light source and the drive signal output from the second reception unit.

(10) A light source device including:

a light source;

a light emission drive unit that supplies a light emission current for causing the light source to emit light;

a drive signal generation unit that generates a drive signal for driving the light emission drive unit on the basis of a light emission control signal for causing the light source to emit light;

a phase difference detection unit that detects a phase difference between a light emission period of the light source and the light emission control signal; and a delay detection unit that detects a delay in the light emission on the basis of the detected phase difference.

(11) A distance measuring device including:

a light source;

a light emission drive unit that supplies a light emission current for causing the light source to emit light;

a drive signal generation unit that generates a drive signal for driving the light emission drive unit on the basis of a light emission control signal for causing the light source to emit light;

a phase difference detection unit that detects a phase difference between a light emission period of the light source and the light emission control signal;

a delay detection unit that detects a delay in the light emission on the basis of the detected phase difference;

a sensor that detects reflected light that is the light emitted from the light source and then reflected from an object; and a processing circuit that performs a process of detecting a distance to the object by measuring a time from the emission of the light to the detection of the reflected light.

REFERENCE SIGNS LIST

1 Distance Measuring Device
2 Distance measurement control device
3 Distance Measuring Sensor
4 Light source device
10 Light source driving device
20 Light source
30 Light receiving element
110 Reception unit
120 Drive signal generation unit
130 Light emission drive unit
140, 371 Phase difference detection unit
151, 152, 372 Filter
160, 370 Delay detection unit
161, 373 Analog-to-digital conversion unit
170 Reception unit
180 Drive voltage detection unit
190 Light receiving unit
320 System control unit
330 Light-source-device control unit
350 Imaging element
360 Image processing unit

The invention claimed is:

1. A light source driving device, comprising:

a light emission drive unit configured to:

supply a light emission current to a light source; and control, based on the supply of the light emission current, the light source to emit light;

a drive signal generation unit configured to generate, based on a first light emission control signal, a drive signal that drives the light emission drive unit, wherein the first light emission control signal is associated with the emission of the light;

a phase difference detection unit configured to detect a phase difference between a signal corresponding to a light emission period of the light source, and the first light emission control signal;

a filter configured to:

attenuate high frequency components of the detected phase difference; and generate a low-frequency phase difference signal based on the attenuation of the high frequency components; and a delay detection unit configured to detect a delay in the emission of the light based on the low-frequency phase difference signal.

2. The light source driving device according to claim 1, wherein the signal includes the drive signal, and the phase difference detection unit is further configured to detect the phase difference between the first light emission control signal and the drive signal.

3. The light source driving device according to claim 1, further comprising a drive voltage detection unit configured to generate a drive voltage signal based on the light emission current, wherein the signal includes the drive voltage signal, and the phase difference detection unit is further configured to detect the phase difference between the first light emission control signal and the drive voltage signal.

4. The light source driving device according to claim 1, further comprising a light receiving unit configured to:

detect the emission of the light from the light source; and generate a light reception signal based on the detection of the emission of the light, wherein the signal includes the light reception signal, and the phase difference detection unit is further configured to detect the phase difference between the first light emission control signal and the light reception signal.

5. The light source driving device according to claim 1, wherein the phase difference detection unit is further configured to output a differential signal corresponding to the detected phase difference, and the detection of the delay in the emission of the light is further based on the differential signal.

6. The light source driving device according to claim 1, further comprising a first reception unit configured to:

receive a second light emission control signal via a signal line path; and output the received second light emission control signal to the drive signal generation unit, wherein the drive signal generation unit is further configured to generate a second drive signal based on the second light emission control signal, and the phase difference detection unit is further configured to detect a second phase difference between the signal corresponding to the light emission period of the light source, and the second light emission control signal.

7. The light source driving device according to claim 6, wherein the second light emission control signal includes a differential light-emission-control signal, the signal line path transfers the differential light-emission-control signal to the first reception unit by conversion of the first light emission control signal into a differential signal, and the first reception unit is further configured to:

receive the differential light-emission-control signal; and convert the differential light-emission-control signal into the second light emission control signal.

8. The light source driving device according to claim 6, further comprising a second reception unit to which the second drive signal is input, wherein the second reception unit is configured to output the second drive signal to the phase difference detection unit, the signal corresponding to the light emission period of the light source includes the second drive signal output from the second reception unit, and the phase difference detection unit is further configured to detect a third phase difference between:

the signal corresponding to the light emission period of the light source, and the second light emission control signal.

9. A light source device, comprising:

a light source;

a light emission drive unit configured to:

supply a light emission current to the light source; and control, based on the supply of the light emission current, the light source to emit light;

a drive signal generation unit configured to generate, based on a light emission control signal, a drive signal that drives the light emission drive unit, wherein the light emission control signal is associated with the emission of the light;

a phase difference detection unit configured to detect a phase difference between a signal corresponding to a light emission period of the light source, and the light emission control signal;

a filter configured to:

attenuate high frequency components of the detected phase difference; and generate a low-frequency phase difference signal based on the attenuation of the high frequency components; and a delay detection unit configured to detect a delay in the emission of the light based on the low-frequency phase difference signal.

10. A distance measuring device, comprising:

a light source;

a light emission drive unit configured to:

supply a light emission current to the light source; and control, based on the supply of the light emission current, the light source to emit light, wherein the light emitted from the light source is reflected from an object as reflected light;

a drive signal generation unit configured to generate, based on a light emission control signal, a drive signal that drives the light emission drive unit, wherein the light emission control signal is associated with the emission of the light;

a phase difference detection unit configured to detect a phase difference between a signal corresponding to a light emission period of the light source, and the light emission control signal;

a filter configured to:

attenuate high frequency components of the detected phase difference; and generate a low-frequency phase difference signal based on the attenuation of the high frequency components;

a delay detection unit configured to detect a delay in the emission of the light based on the low-frequency phase difference signal;

a sensor configured to detect the reflected light; and a processing circuit configured to:

measure a time from the emission of the light to the detection of the reflected light; and determine a distance to the object based on the measured time.

* * * * *